US011943840B2

(12) United States Patent
Stagg

(10) Patent No.: US 11,943,840 B2
(45) Date of Patent: Mar. 26, 2024

(54) ASSOCIATING DIVERSE BLUETOOTH DEVICES

(71) Applicant: Cattron North America, Inc., Warren, OH (US)

(72) Inventor: David Stagg, Flat Rock, NC (US)

(73) Assignee: Cattron North America, Inc., Warren, OH (US)

( * ) Notice: Subject to any disclaimer, the term of this patent is extended or adjusted under 35 U.S.C. 154(b) by 344 days.

(21) Appl. No.: 17/405,597

(22) Filed: Aug. 18, 2021

(65) Prior Publication Data

US 2022/0295267 A1 Sep. 15, 2022

Related U.S. Application Data

(60) Provisional application No. 63/160,324, filed on Mar. 12, 2021.

(51) Int. Cl.
*H04W 8/26* (2009.01)
*H04L 61/5038* (2022.01)
*H04W 4/80* (2018.01)
*H04L 101/622* (2022.01)

(52) U.S. Cl.
CPC ........... *H04W 8/26* (2013.01); *H04L 61/5038* (2022.05); *H04W 4/80* (2018.02); *H04L 2101/622* (2022.05)

(58) Field of Classification Search
CPC ......... H04W 8/26; H04W 4/80; H04W 12/50; H04W 84/18; H04W 12/71; H04L 61/5038; H04L 2101/622
USPC ...................................................... 455/41.2
See application file for complete search history.

(56) References Cited

U.S. PATENT DOCUMENTS

| 9,736,672 | B2 | 8/2017 | Stojanovski |
| 2015/0195861 | A1 | 7/2015 | Grothaus |
| 2016/0183318 | A1* | 6/2016 | Luo ..................... G06K 7/1417 |
| | | | 455/556.1 |

(Continued)

FOREIGN PATENT DOCUMENTS

KR 101667248 B1 10/2016

OTHER PUBLICATIONS

Extended European search report for EP22161837.4 that claims priority to the instant application; dated Aug. 10, 2022, 8 pages.

*Primary Examiner* — Eugene Yun
(74) *Attorney, Agent, or Firm* — Anthony G. Fussner; Harness, Dickey & Pierce, P.L.C.

(57) ABSTRACT

An exemplary method relates to associating diverse devices each including a unique public media access control address (Public MAC address). In this exemplary embodiment, the method includes providing a plurality of devices with a shared private media access control address (Shared Private MAC address) such that the Shared Private MAC address is known to each of the devices and usable for initiating a learning interchange during which the devices exchange their unique Public MAC addresses with each other and are thereby associated with each other; and/or using a shared private media access control address (Shared Private MAC address) known to each of a plurality of devices to initiate a learning interchange that includes the devices exchanging their unique Public MAC addresses with each other and thereby associating the devices with each other.

23 Claims, 2 Drawing Sheets

(56) References Cited

U.S. PATENT DOCUMENTS

2020/0115195 A1* 4/2020 Lee .................... G06V 10/235

* cited by examiner

ASSOCIATING DIVERSE BLUETOOTH DEVICES

CROSS-REFERENCE TO RELATED APPLICATION

This application claims priority to and the benefit of U.S. Provisional Patent Application No. 63/160,324 filed Mar. 12, 2021. The entire disclosure of the above application is incorporated herein by reference.

FIELD

The present disclosure generally relates to associating diverse Bluetooth devices, such as associating an operator control unit (OCU) with a machine control unit (MCU) of an industrial wireless remote control system, etc.

BACKGROUND

This section provides background information related to the present disclosure which is not necessarily prior art.

An industrial wireless remote control system may be used for controlling equipment and machinery. The wireless remote control system may include a wireless remote control device configured for wireless communication with a machine control unit. The wireless remote control device may include a user interface to allow the user to input commands to be transmitted to the machine control unit for controlling a machine.

DRAWINGS

The drawings described herein are for illustrative purposes only of selected embodiments and not all possible implementations, and are not intended to limit the scope of the present disclosure.

Corresponding reference numerals may indicate corresponding (but not necessarily identical) parts throughout the several views of the drawings.

DETAILED DESCRIPTION

Figure 1:
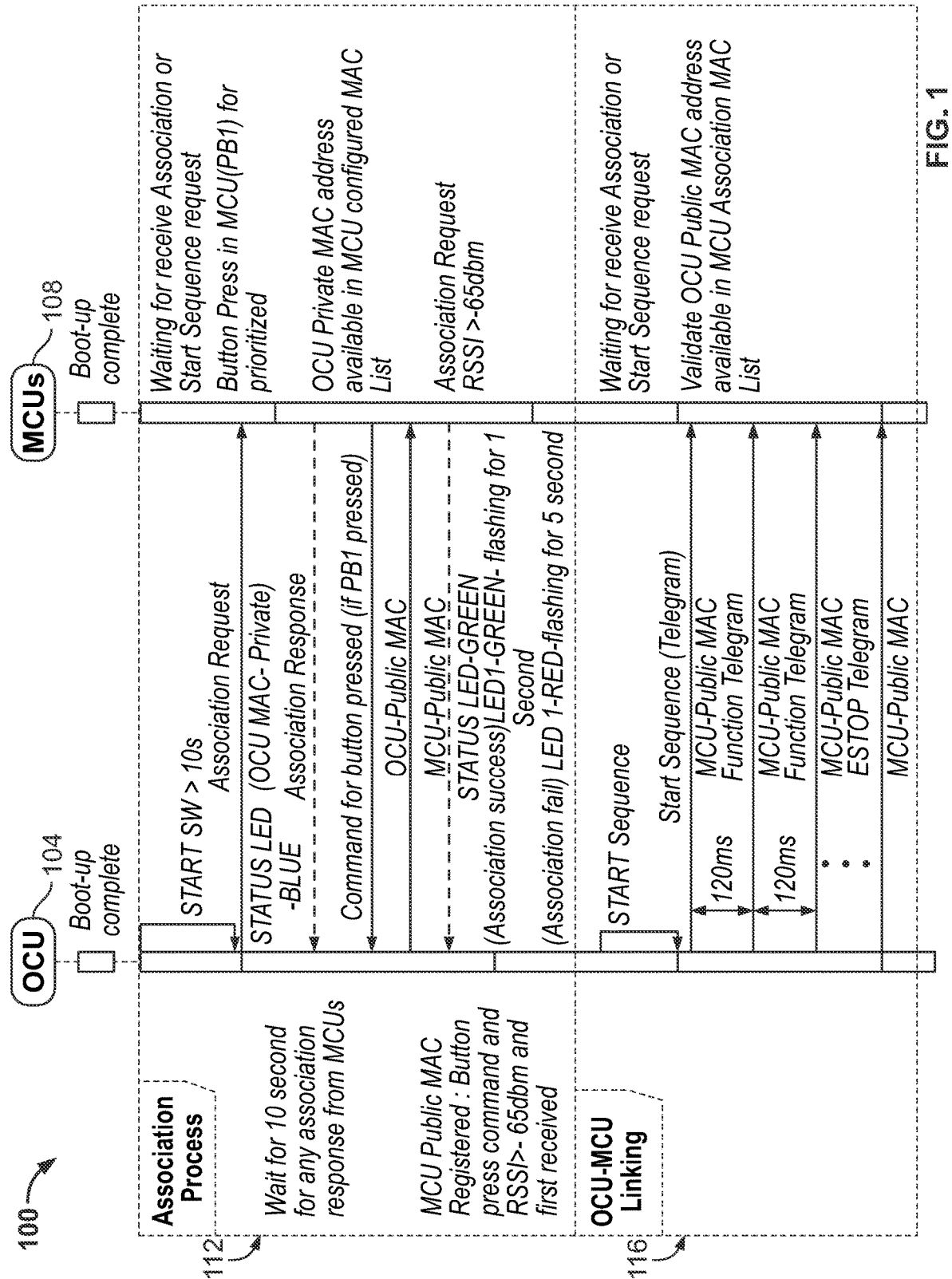
FIG. 1 illustrates an example method of associating diverse Bluetooth devices according to an exemplary embodiment of the present disclosure.

Example embodiments will now be described more fully with reference to the accompanying drawings.

An industrial wireless remote control system may include an operator control unit (OCU) configured for wireless communication with a machine control unit (MCU). The OCU may include a user interface (e.g., pushbutton(s), joystick(s), touchscreen, etc.) that allows a user to input commands to be transmitted to the machine control unit for controlling operation of a machine. The OCU may be configured for wireless communication with a machine control unit (MCU) via Bluetooth (e.g., Bluetooth Low Energy (BLE), etc.), other short-range wireless communication protocol (e.g., a radio frequency (RF), infrared (IR), Wi-Fi, Zig-Bee, Ultra-Wide Band, Near Field Communication (NFC), radio-frequency identification (RFID), etc.), etc. By way of example, the OCU may be usable for controlling operation of an overhead crane, such as start, stop, speed control (e.g., hoist speed, trolley speed, bridge speed, etc.), motion control (e.g., hoist up, hoist down, bridge forward, bridge reverse, trolley forward, trolley reverse, etc.), etc.

In exemplary embodiments disclosed herein, an OCU is configured for wireless communication with a machine control unit (MCU) via Bluetooth Low Energy (BTLE). The OCU and MCU (broadly, Bluetooth devices or industrial wireless remote control devices) may be associated with each other by securely gathering, exchanging, and/or learning the unique public media access control address (Public MAC address) of the OCU and MCU by using a shared private media access control address (Shared Private MAC address) as disclosed herein.

Also disclosed herein are exemplary methods of associating devices (e.g., Bluetooth devices, OCUs, MCUs, industrial wireless remote control devices, other wireless devices, etc.) that include the devices securely gathering, exchanging, and/or learning each other's unique Public MAC address by using a Shared Private MAC address. In exemplary embodiments, a method of associating devices includes using a Shared Private MAC address (48 bit Shared Private MAC address) that is known to all devices to initiate a learning interchange. During the learning interchange, the devices securely gather, exchange, and/or learn each other's unique Public MAC address (48 bit Public MAC address). After the devices' unique Public MAC addresses have been exchanged and the devices associated with each other, each device may then only be responsive to other associated devices.

For example, the devices may include an OCU and MCU of a crane remote control system. In this example, the OCU and MCU may only respond to each other after the OCU and MCU have been associated with each other after the exchange of their unique Public MAC addresses as disclosed herein.

In exemplary embodiments, the association method may be triggered by user request (e.g., the user pushing and holding down a pushbutton switch, etc.), and the Private MAC address is part of the common firmware of each device. The Private MAC address may comprise software programmed into the memory (e.g., read-only memory (ROM), flash ROM, etc.) of each device. For example, the Private MAC address may comprise software permanently programmed in the ROM of each device. Advantageously, exemplary embodiments disclosed herein may allow diverse devices (e.g., Bluetooth devices, OCUs, MCUs, other devices, etc.) to be easily configured as a system, network, etc. of associated devices after the devices have exchanged their unique Public MAC addresses, e.g., via pushbutton pairing without requiring programming input, address management, or frequency management by the user, etc.

With reference now to the figures, FIG. 1 illustrates example method 100 of associating diverse Bluetooth devices according to an exemplary embodiment of the present disclosure. In this example method 100, the Bluetooth devices comprise an operator control unit (OCU) 104 and a machine control unit (MCU) 108 of an industrial wireless remote control system for controlling operation of a machine (e.g., overhead crane, etc.). The OCU and MCU are configured for wireless communication via Bluetooth Low Energy (BLE) short-range wireless communication protocol. In other exemplary embodiments, the method 100 may be used for associating other devices, such as other devices that are configured for communication via a different wireless communication protocol other than Bluetooth, other industrial wireless remote control devices, devices that are not an OCU and MCU of an industrial wireless remote control system, etc.

As shown in FIG. 1, the method 100 generally includes an association process 112 and an OCU-MCU Linking process 116 thereafter. After boot-up is complete for the OCU 104 and the MCU 108, the association process 112 may be initiated and requested upon user request via a switch (broadly, user interface) of the OCU 104 while the MCU 108 is idle and/or waiting for a receive Association or Start Sequence request. The MCU 108 may be prioritized for association with the OCU 104 upon user request via a switch (broadly, user interface) of the MCU 108.

In this example, the association process 112 is initiated and requested by the user pressing and holding down a pushbutton switch of the OCU 104 (e.g., pushbutton switch 218 of OCU 204 in FIG. 2, etc.) for a predetermined amount of time (e.g., 10 seconds, more than 10 seconds, less than 10 seconds, etc.). The user interface of the OCU 104 may indicate that the association process has been initiated, e.g., via a multicolored status LED 222 (FIG. 2) illuminating blue light, etc.

Figure 2:
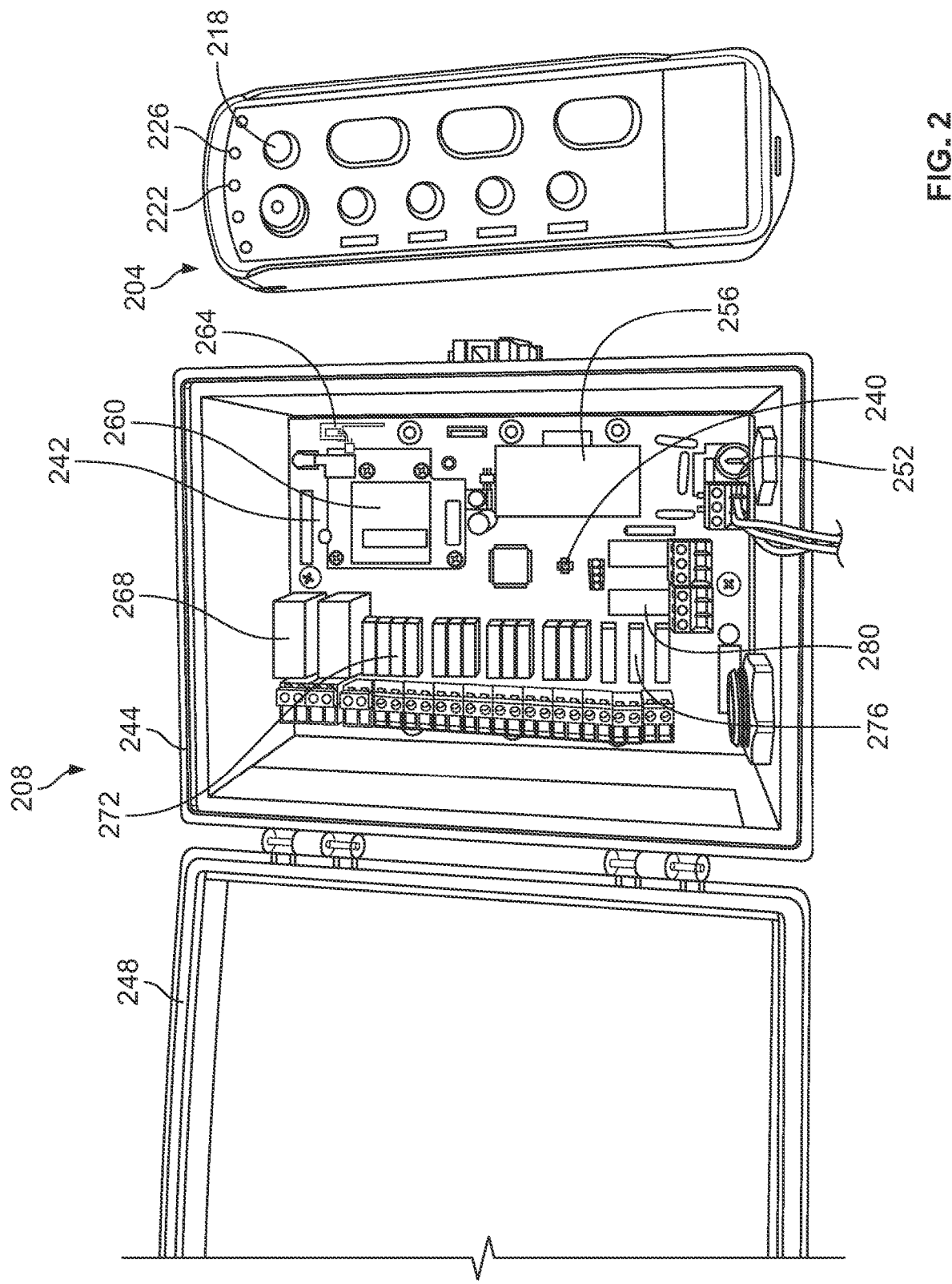
FIG. 2 illustrates examples of a machine control unit (MCU) and operator control unit (OCU) that may be associated with each other via the method shown in FIG. 1 according to an exemplary embodiment of the present disclosure.

Also in this example, the MCU 108 is prioritized for association with the OCU 104 by a user pressing a pushbutton switch of the MCU 108 (e.g., pushbutton switch 240 of the MCU 208 in FIG. 2, etc.). If the pushbutton switch of the MCU 108 is not pressed to prioritize the MCU 108 for association to the OCU 104, then the OCU 104 will associate with the MCU having the highest received signal strength. In which case, the OCU 104 should be located closest to the MCU that the user wants to associate with the OCU 104 (than to any other MCUs) before the association process is initiated.

After the association process 112 is initiated and requested, the OCU 104 shares its OCU private MAC address with the MCU 108. The OCU 104 then waits for a predetermined amount of time (e.g., 10 seconds, more than 10 seconds, less than 10 seconds, etc.) for any association response from any MCUs, e.g., whether or not the shared OCU private MAC address is also available in the MCU configured MAC list.

If the shared OCU private MAC address is available in the MCU configured MAC list of the MCU 108 and prioritization was requested (e.g., prioritization button pressed, etc.) by the MCU 108, then the OCU 104 shares its public MAC address with the MCU 108. If prioritization was not requested, then the OCU 104 shares its public MAC address with the MCU having the highest received signal strength (e.g., RSSI greater than 65 dbm, etc.).

In response to receiving the OCU public MAC address, the MCU 108 shares its public MAC address with the OCU 104. The OCU 104 will register the MCU public MAC address of the MCU 108 or other MCU depending on which MCU requested priority, has a sufficiently high RSSI (e.g., RSSI greater than 65 dbm, etc.), and which MCU public MAC address was received first. The user interface of the OCU 104 may indicate whether or not the association process was successful, e.g., via a multicolored status LED (e.g., LED 226 of OCU 204 (FIG. 2, etc.) flashing green for 1 second if successful and flashing red for 5 seconds if unsuccessful, etc. At this point, the user may confirm that the OCU 104 is associated with the correct MCU 108 by using the OCU 104 to perform a non-critical function, e.g., alarm, etc.

After the OCU 104 has been successfully associated with the MCU 108, the OCU-MCU linking process 116 is initiated. The OCU 104 sends a start sequence telegram or command to the MCU 108, which is identified by its MCU Public MAC address previously shared with the OCU 104 during the association process 112. The MCU 108 validates that the OCU Public MAC address is available in MCU Association MAC List. The OCU 104 may also send additional telegrams (e.g., function telegrams, ESTOP telegram, etc.) to the MCU 108, which telegrams may include commands for controlling operation of a machine. Accordingly, the exemplary method 100 may advantageously allow the OCU 104 and MCU 108 to be associated with each other for use in an industrial remote control system via pushbutton pairing without requiring programming input, address management, or frequency management by the user.

In addition, more than one OCU may be associated and linked to the MCU 108 via the method 100. For example, eight OCUs may be associated to the MCU 108 at a single time. Each OCU, however, may only be able to associate to a single MCU such that the OCU will disassociate from a first MCU if the OCU is associated to a second MCU.

In addition, the user interface of the MCU 108 may be configured to allow a user to disassociate the MCU 108 from the OCU 104 such that the disassociated OCU 104 is inoperable for transmitting commands to the MCU 108 for controlling operation of the machine. In which case, the MCU 108 will not be responsive to the disassociated OCU 104 as the MCU 108 is only responsive to OCUs associated to the MCU 108. By way of example, the MCU 108 may include a pushbutton switch (e.g., a pushbutton switch 240 (FIG. 2), etc.) that the user may press and hold down for a predetermined amount of time (e.g., 20 seconds, more than 20 seconds, less than 20 seconds, etc.) to disassociate the MCU 108 from the OCU 104 when the MCU 108 is in a passive state. The MCU 108 may indicate to the user when the OCU 104 has been disassociated from and forgotten by the MCU 108, e.g., via a multicolored status LED illuminating red light (e.g., LED 242 (FIG. 2), etc.), etc.

FIG. 2 illustrates examples of an OCU 204 and MCU 208 (broadly, devices) of a crane remote control system (broadly, a system) that may be associated with each other via the method 100 show in FIG. 1 according to an exemplary embodiment. In this exemplary embodiment, the OCU 204 and MCU 208 are configured for wireless communication via Bluetooth Low Energy (BLE) short-range wireless communication protocol. In other exemplary embodiments, the system may include an OCU, MCU, or other devices that are configured for communication via a different wireless communication protocol other than Bluetooth and/or that are configured for use in another industrial and/or non-industrial wireless remote control systems, etc.

The OCU 204 includes a user interface configured to allow a user to input commands to be transmitted to the MCU 208 for controlling a machine. In this exemplary embodiment, the OCU user interface include a plurality of pushbutton switches for controlling operation of an overhead crane. As shown in FIG. 2, the OCU user interface includes a stop pushbutton switch, an ON/alarm pushbutton switch 218, hoist motion and speed control pushbutton switches, trolley motion and speed control pushbutton switches, and bridge motion and speed control pushbutton switches. The OCU user interface also includes multicolored (e.g., bi-colored, tri-colored, etc.) status LEDs 222, 226 for indicating status information to the user. Accordingly, this example OCU 204 comprises a handheld pushbutton remote control device usable for controlling operation of an overhead crane, including start, stop, speed control (e.g., hoist speed, trolley speed, bridge speed, etc.), and motion control (e.g., hoist up, hoist down, bridge forward, bridge reverse, trolley forward, trolley reverse, etc.).

In alternative embodiments, the OCU may include other suitable user interfaces for receiving commands and/or other inputs from a user, including a touch screen interface, keypad, etc. The operator control unit may include a display, lights, light emitting diodes (LEDs), indicators, etc. for displaying information to the user. The operator control unit (OCU) may also include one or more processors, memory (e.g., one or more hard disks, flash memory, solid state memory, random access memory, read only memory, etc.), etc. configured to operate the OCU and store information related to operation of the OCU. For example, the shared Private MAC Address may be part of the common firmware stored within memory of the OCU 204.

With continued reference to FIG. 2, the MCU 208 includes a user interface configured to allow a user to prioritize the MCU 208 for association with the OCU 204. In this exemplary embodiment, the MCU user interface includes a pushbutton switch 240 to prioritize the MCU 208. The OCU 204 may then be associated to the MCU 208 by pressing and holding the OCU pushbutton 218 and the MCU pushbutton 240, to thereby initiate the associate process and prioritize the MCU 208 for association to the OCU 204. If the MCU pushbutton 240 is not pressed and held down, then the OCU 204 will be paired to the MCU 208 or other MCU that has the highest received signal strength. In which case, the user should locate the OCU 204 closest to the MCU that the user wants to associate to the OCU 204. Advantageously, this exemplary embodiment allows the OCU 204 to be associated to the MCU 208 via pushbutton pairing without requiring programming input, address management, or frequency management by the user.

The MCU user interface may also be configured to allow a user to disassociate the MCU 208 from the OCU 204. In this exemplary embodiment, the user may press and hold down the MCU pushbutton switch 240. In this exemplary embodiment, the MCU 208 includes the pushbutton switch 240 that the user may press and hold down for a predetermined amount of time (e.g., 20 seconds, more than 20 seconds, less than 20 seconds, etc.) to disassociate the MCU 208 from the OCU 204 when the MCU 208 is in a passive state. The MCU 208 may indicate to the user when the OCU 204 has been disassociated from and forgotten by the MCU 208, e.g., by the multicolored status LED 242 illuminating red light.

With continued reference to FIG. 2, the MCU 208 also includes a housing 244 and a hinged lockable transparent lid 248. Within the housing 244, the MCU 208 generally includes a power supply terminal 252, an AC switch mode power supply 256, and RF module 260, a printed F antenna 264, two main safety relays 268, function relays 272, auxiliary relays 276, and two changeover relays 280. But as disclosed herein, aspects of the present disclosure should not be limited to the specific OCU 204 and MCU 208 shown in FIG. 2 as exemplary embodiments disclosed herein may be configured for associating a wide range of other devices.

The present disclosure generally relates to associating diverse Bluetooth devices, such as associating an operator control unit (OCU) with a machine control unit (MCU) of an industrial wireless remote control system for an overhead crane, etc. An exemplary method relates to associating diverse devices each including a unique public media access control address (Public MAC address). The exemplary method includes providing a plurality of devices with a shared private media access control address (Shared Private MAC address) such that the Shared Private MAC address is known to each of the devices and usable for initiating a learning interchange during which the devices exchange their unique Public MAC addresses with each other and are thereby associated with each other; and/or using a shared private media access control address (Shared Private MAC address) known to each of a plurality of devices to initiate a learning interchange that includes the devices exchanging their unique Public MAC addresses with each other and thereby associating the devices with each other.

In exemplary embodiments, the method includes providing the Shared Private MAC address as part of the common firmware of each of the devices.

In exemplary embodiments, the method includes programming the Shared Private MAC address into memory of each of the devices.

In exemplary embodiments, the Shared Private MAC address is a 48 bit Private MAC address known to each of the devices. The unique Public MAC addresses of the devices are 48 bit Public MAC addresses unique to each corresponding device.

In exemplary embodiments, the method associates the devices with each other by the exchange of their unique Public MAC addresses without requiring programming input, address management, or frequency management by a user.

In exemplary embodiments, the method is triggered upon user request that is input via at least one of the devices.

In exemplary embodiments, the method is triggered by a user pushing a pushbutton switch of at least one of the devices.

In exemplary embodiments, the devices are configured for wireless communication via Bluetooth short-range wireless communication protocol, such as Bluetooth Low Energy (BLE) short-range wireless communication protocol, etc.

In exemplary embodiments, the devices comprise wireless remote control devices of an industrial wireless remote control system.

In exemplary embodiments, the devices comprise a machine control unit (MCU) having a unique Public MAC address and an operator control unit (OCU) having a unique Public MAC address. After the OCU and the MCU have exchanged their unique Public MAC addresses with each other such that the OCU is associated with the MCU, the OCU is operable for transmitting commands input by a user to the MCU for controlling operation of a machine. In such exemplary embodiments, the method may include associating the OCU to an MCU having a highest received signal strength when more than one MCU is available to be associated with the OCU. The OCU may include a switch to allow a user to initiate the learning interchange and have the OCU and MCU exchange their unique Public MAC addresses with each other to thereby associate the OCU with the MCU. The MCU may include a switch to allow a user to prioritize the MCU for association with the OCU. And, the method may include associating the OCU to the MCU when the switch of the OCU and the switch of the MCU have both been activated; or associating the OCU to an MCU having a highest received signal strength when the switch of the OCU is activated but the switch of the MCU is not activated. The method may further include disassociating the OCU from the MCU such that the disassociated OCU is inoperable for transmitting commands to the MCU for controlling operation of the machine and/or such that the MCU is no longer responsive to the disassociated OCU as the MCU is only responsive to operator control units that are associated with the MCU.

The machine may comprise an overhead crane including a hoist, trolley, and a bridge. The method may include after the OCU is associated with the MCU, using the OCU to transmit commands to the MCU for controlling operation of the overhead crane including one or more of starting, stopping, controlling speed of one or more of the hoist, trolley, and/or bridge, and/or controlling motion of one or more of the hoist, trolley, and/or bridge.

In exemplary embodiments, a system comprises a machine control unit (MCU) having a unique public media access control address (Public MAC address), and an operator control unit (OCU) having a unique Public MAC address different than the unique Public MAC address of the MCU. The MCU and OCU each have a same private media access control address (Shared Private MAC address). The system is configured such that the Shared Private MAC address is usable for initiating a learning interchange during which the OCU and MCU exchange their unique Public MAC addresses with each other to thereby associate the OCU with the MCU whereby the OCU is operable for transmitting commands to the associated MCU for controlling operation of a machine.

In exemplary embodiments, the Shared Private MAC address comprises a part of the common firmware of the OCU and the MCU; and/or the Shared Private MAC address is stored within memory of the OCU and within memory of the MCU.

In exemplary embodiments, the Shared Private MAC address is a 48 bit Private MAC address known to the OCU and the MCU. The unique Public MAC address of the MCU is a 48 bit Public MAC address. The unique Public MAC address of the OCU is a 48 bit Public MAC address different than the 48 bit Public MAC address of the MCU.

In exemplary embodiments, the OCU and MCU are configured for wireless communication with each other via Bluetooth short-range wireless communication protocol, such as Bluetooth Low Energy (BLE) short-range wireless communication protocol, etc.

In exemplary embodiments, the system is configured to associate the OCU to an MCU having a highest received signal strength when more than one MCU is available to be associated with the OCU.

In exemplary embodiments, the OCU includes a user interface configured to allow a user to input commands to be transmitted to the machine control unit for controlling a machine. The user interface is further configured to allow the user to initiate the learning interchange during which the OCU and MCU exchange their unique Public MAC addresses with each other to thereby associate the OCU with the MCU without requiring programming input, address management, or frequency management by the user.

In exemplary embodiments, the OCU includes a switch to allow a user to initiate the learning interchange during which the OCU and MCU exchange their unique Public MAC addresses to thereby associate the OCU with the MCU. The MCU includes a switch to allow a user to prioritize the MCU for association with the OCU. The system is configured to: associate the OCU with the MCU when the switch of the OCU and the switch of the MCU have both been activated; or associate the OCU to an MCU having a highest received signal strength when the switch of the OCU is activated but the switch of the MCU is not activated.

In exemplary embodiments, the OCU includes a switch to allow a user to disassociate the OCU from the MCU such that the disassociated OCU is inoperable for transmitting commands to the MCU for controlling operation of the machine and/or such that the MCU is no longer responsive to the disassociated OCU as the system is configured such that the MCU is only responsive to operator control units that are associated with the MCU.

In exemplary embodiments, the MCU is configured such that more than one OCU may be associated to the MCU at a given time. The OCU is configured to be associated with only a single MCU such that the OCU will dissociate from a first MCU when the OCU is associated to a second MCU.

In exemplary embodiments, the machine comprises an overhead crane including a hoist, trolley, and a bridge. The method includes after the OCU is associated with the MCU, using the OCU to transmit commands to the MCU for controlling operation of the overhead crane including one or more of starting, stopping, controlling speed of one or more of the hoist, trolley, and/or bridge, and/or controlling motion of one or more of the hoist, trolley, and/or bridge.

Aspects of the present disclosure should not be limited to only Bluetooth devices or Bluetooth (BLE) devices as exemplary embodiments disclosed herein can be applied to and/or used with other IP based addressing schemes. For example, exemplary embodiments disclosed herein may be configured for associating diverse devices configured for wireless communication via another short-range wireless communication protocol (e.g., a radio frequency (RF), infra-red (IR), Wi-Fi, Zig-Bee, Ultra-Wide Band, Near Field Communication (NFC), radio-frequency identification (RFID), etc.), etc.

Aspects of the present disclosure should also not be limited to OCUs and MCUs of industrial wireless remote control systems as exemplary embodiments disclosed herein may be configured for associating other device types by securely exchanging and/or gathering the devices' unique Public MAC addresses by using a Shared Private MAC address as disclosed herein. In addition, aspects of the present disclosure should also not be limited to overhead cranes as exemplary embodiments may be configured for use with other industrial and non-industrial applications, e.g., other overhead cranes and hoists, conveyor systems, steel stockholders, concrete pumps, screening machines, vacuum trucks, pumping equipment, loader cranes, crawler cranes, terrain cranes, on and off highway mobile equipment, manufacturing, transportation and warehousing equipment and machinery, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method relating to associating diverse devices each including a unique public media access control address (Public MAC address), the method comprising:
   providing a plurality of devices with a shared private media access control address (Shared Private MAC address) such that the Shared Private MAC address in a broadcast mode is known to each of the devices and usable for initiating a learning interchange during which each of the devices securely exchange their unique Public MAC addresses with each other and are thereby associated with each other; and/or
   using the Shared Private MAC address in the broadcast mode known to each of the plurality of devices to initiate the learning interchange that includes the devices securely exchanging their unique Public MAC addresses with each other and thereby associating the devices with each other;
   wherein:
      the method is triggered upon user request that is input via at least one of the devices;
      the devices comprise wireless remote control devices of an industrial wireless remote control system including a machine control unit (MCU) having a unique Public MAC address and an operator control unit (OCU) having a unique Public MAC address; and
      after the OCU and the MCU have securely exchanged their unique Public MAC addresses with each other such that the OCU is associated with the MCU, the OCU is operable for wirelessly transmitting commands input by a user to the MCU for wireless remote controlling operation of a machine, whereby the MCU is only responsive to operator control units that are associated with the MCU.

2. The method of claim 1, wherein the method includes providing the Shared Private MAC address as part of common firmware of each of the devices.

3. The method of claim 1, wherein the method includes programming the Shared Private MAC address into memory of each of the devices.

4. The method of claim 1, wherein:
   the Shared Private MAC address is a 48 bit Private MAC address known to each of the devices; and
   the unique Public MAC addresses of the devices are 48 bit Public MAC addresses unique to each corresponding device.

5. The method of claim 1, wherein the method associates the devices with each other by the secure exchange of their unique Public MAC addresses without requiring programming input, address management, or frequency management by a user.

6. The method of claim 1, wherein the MCU and/or the OCU is configured to allow a user input to disassociate the OCU from the MCU such that the disassociated OCU is inoperable for wirelessly transmitting commands to the MCU for wireless remote controlling operation of the machine and such that the MCU is no longer responsive to the disassociated OCU as the MCU is only responsive to operator control units that are associated with the MCU.

7. The method of claim 1, wherein:
the devices are configured for wireless communication via Bluetooth short-range wireless communication protocol; and/or
the devices are configured for wireless communication via Bluetooth Low Energy (BLE) short-range wireless communication protocol.

8. The method of claim 1, wherein the OCU includes a user interface configured to allow a user to input commands to be wirelessly transmitted to the machine control unit for wireless remote controlling the machine including starting, stopping, and controlling speed of the machine, the user interface further configured to allow the user to input the user request to trigger the method and initiate the learning interchange during which each of the OCU and MCU securely exchange their unique Public MAC addresses with each other to thereby associate the OCU with the MCU without requiring programming input, address management, or frequency management by the user.

9. The method of claim 1, wherein:
the OCU includes a switch to allow a user to initiate the learning interchange and have the OCU and MCU securely exchange their unique Public MAC addresses with each other to thereby associate the OCU with the MCU;
the MCU includes a switch to allow a user to prioritize the MCU for association with the OCU; and
the method includes:
initiating an associating process of the OCU to the MCU when the switch of the OCU is pressed and held down for a predetermined amount of time; and
prioritizing the MCU for association with the OCU when the switch of the MCU is pressed.

10. The method of claim 1, wherein the method includes associating the OCU to an MCU having a highest received signal strength when more than one MCU is available to be associated with the OCU.

11. The method of claim 1, wherein the method further includes disassociating the OCU from the MCU such that the disassociated OCU is inoperable for wirelessly transmitting commands to the MCU for wireless remote controlling operation of the machine and such that the MCU is no longer responsive to the disassociated OCU as the MCU is only responsive to operator control units that are associated with the MCU.

12. The method of claim 1, wherein:
the machine comprises an overhead crane including a hoist, a trolley, and a bridge; and
the method includes after the OCU is associated with the MCU, using the OCU to transmit commands to the MCU for wireless remote controlling operation of the overhead crane including one or more of starting, stopping, controlling speed of one or more of the hoist, trolley, and/or bridge, and/or controlling motion of one or more of the hoist, trolley, and/or bridge.

13. A method relating to associating diverse devices each including a unique public media access control address (Public MAC address), the method comprising:
providing a plurality of devices with a shared private media access control address (Shared Private MAC address) such that the Shared Private MAC address is known to each of the devices and usable for initiating a learning interchange during which the devices exchange their unique Public MAC addresses with each other and are thereby associated with each other; and/or
using a shared private media access control address (Shared Private MAC address) known to each of a plurality of devices to initiate a learning interchange that includes the devices exchanging their unique Public MAC addresses with each other and thereby associating the devices with each other;
wherein:
the devices comprise a machine control unit (MCU) having a unique Public MAC address and an operator control unit (OCU) having a unique Public MAC address;
after the OCU and the MCU have exchanged their unique Public MAC addresses with each other such that the OCU is associated with the MCU, the OCU is operable for transmitting commands input by a user to the MCU for controlling operation of a machine;
the OCU includes a switch to allow a user to initiate the learning interchange and have the OCU and MCU exchange their unique Public MAC addresses with each other to thereby associate the OCU with the MCU;
the MCU includes a switch to allow a user to prioritize the MCU for association with the OCU; and
the method includes:
associating the OCU to the MCU when the switch of the OCU and the switch of the MCU have both been activated; or
associating the OCU to an MCU having a highest received signal strength when the switch of the OCU is activated but the switch of the MCU is not activated.

14. An industrial wireless remote control system comprising:
a machine control unit (MCU) having a unique public media access control address (Public MAC address); and
an operator control unit (OCU) having a unique Public MAC address different than the unique Public MAC address of the MCU;
the MCU and OCU each having a same private media access control address (Shared Private MAC address);
wherein the system is configured such that the Shared Private MAC address is usable in a broadcast mode for initiating a learning interchange during which each of the OCU and MCU securely exchange their unique Public MAC addresses with each other to thereby associate the OCU with the MCU whereby the OCU is operable for wirelessly transmitting commands to the associated MCU for wireless remote controlling operation of a machine, and whereby the MCU is only responsive to operator control units that are associated with the MCU;
wherein the OCU is configured to allow a user to input a user request to trigger and initiate the learning interchange during which each of the OCU and MCU securely exchange their unique Public MAC addresses with each other to thereby associate the OCU with the MCU.

15. The system of claim 14, wherein:
the Shared Private MAC address comprises a part of common firmware of the OCU and the MCU; and/or
the Shared Private MAC address is stored within memory of the OCU and within memory of the MCU.

16. The system of claim 14, wherein:
the Shared Private MAC address is a 48 bit Private MAC address known to the OCU and the MCU;
the unique Public MAC address of the MCU is a 48 bit Public MAC address; and the unique Public MAC address of the OCU is a 48 bit Public MAC address different than the 48 bit Public MAC address of the MCU.

17. The system of claim 14, wherein:
the OCU and MCU are configured for wireless communication with each other via Bluetooth short-range wireless communication protocol; and/or
the OCU and MCU are configured for wireless communication with each other via Bluetooth Low Energy (BLE) short-range wireless communication protocol.

18. The system of claim 14, wherein the system is configured to associate the OCU to an MCU having a highest received signal strength when more than one MCU is available to be associated with the OCU.

19. The system of claim 14, wherein the OCU includes a user interface configured to allow a user to input commands to be wirelessly transmitted to the machine control unit for wireless remote controlling a machine, the user interface further configured to allow the user to input the user request to trigger and initiate the learning interchange during which each of the OCU and MCU securely exchange their unique Public MAC addresses with each other to thereby associate the OCU with the MCU without requiring programming input, address management, or frequency management by the user.

20. The system of claim 14, wherein the OCU includes a switch to allow a user to disassociate the OCU from the MCU such that the disassociated OCU is inoperable for transmitting commands to the MCU for controlling operation of the machine and such that the MCU is no longer responsive to the disassociated OCU as the system is configured such that the MCU is only responsive to operator control units that are associated with the MCU.

21. The system of claim 14, wherein:
the MCU is configured such that more than one OCU may be associated to the MCU at a given time; and
the OCU is configured to be associated with only a single MCU such that the OCU will dissociate from a first MCU when the OCU is associated to a second MCU.

22. The system of claim 14, wherein:
the machine comprises an overhead crane including a hoist, a trolley, and a bridge; and
the system is configured such that after the OCU is associated with the MCU, the OCU is usable to wirelessly transmit commands to the MCU for wireless remote controlling operation of the overhead crane including one or more of starting, stopping, controlling speed of one or more of the hoist, trolley, and/or bridge, and/or controlling motion of one or more of the hoist, trolley, and/or bridge.

23. A system comprising:
a machine control unit (MCU) having a unique public media access control address (Public MAC address); and
an operator control unit (OCU) having a unique Public MAC address different than the unique Public MAC address of the MCU;
the MCU and OCU each having a same private media access control address (Shared Private MAC address);
wherein:
the system is configured such that the Shared Private MAC address is usable for initiating a learning interchange during which the OCU and MCU exchange their unique Public MAC addresses with each other to thereby associate the OCU with the MCU whereby the OCU is operable for transmitting commands to the associated MCU for controlling operation of a machine;
the OCU includes a switch to allow a user to initiate the learning interchange during which the OCU and MCU exchange their unique Public MAC addresses to thereby associate the OCU with the MCU;
the MCU includes a switch to allow a user to prioritize the MCU for association with the OCU; and
the system is configured to:
associate the OCU with the MCU when the switch of the OCU and the switch of the MCU have both been activated; or
associate the OCU to an MCU having a highest received signal strength when the switch of the OCU is activated but the switch of the MCU is not activated.

* * * * *